US009488289B2

(12) United States Patent
Kelm et al.

(10) Patent No.: US 9,488,289 B2
(45) Date of Patent: Nov. 8, 2016

(54) VARIABLE SUCTION DEVICE FOR AN A/C COMPRESSOR TO IMPROVE NVH BY VARYING THE SUCTION INLET FLOW AREA

(71) Applicant: Halla Visteon Climate Control Corp., Daejeon (KR)

(72) Inventors: Brian R. Kelm, Plymouth, MI (US); Pete Edward Ganster, Plymouth, MI (US); Michael Gregory Theodore, Jr., Plymouth, MI (US); Rodney James Callahan, Novi, MI (US); John Richard Mikkelsen, Novi, MI (US)

(73) Assignee: Hanon Systems, Daejeon-si (KR)

( * ) Notice: Subject to any disclaimer, the term of this patent is extended or adjusted under 35 U.S.C. 154(b) by 110 days.

(21) Appl. No.: 14/154,568

(22) Filed: Jan. 14, 2014

(65) Prior Publication Data
US 2015/0198257 A1 Jul. 16, 2015

(51) Int. Cl.
F16K 11/10 (2006.01)
F04B 27/18 (2006.01)
F16K 15/06 (2006.01)
(Continued)

(52) U.S. Cl.
CPC ......... F16K 11/105 (2013.01); F04B 27/1804 (2013.01); F16K 15/025 (2013.01); F16K 15/063 (2013.01); F16K 15/066 (2013.01); F16K 17/0413 (2013.01); F16K 17/082 (2013.01); F04B 2027/1868 (2013.01); F04B 2027/1881 (2013.01); Y10T 137/7764 (2015.04); Y10T 137/7838 (2015.04); Y10T 137/7925 (2015.04); Y10T 137/86879 (2015.04)

(58) Field of Classification Search
CPC ............. F04B 27/1804; F04B 49/225; F04B 27/1881; F04B 2027/1868; F04B 2027/1831; F04B 27/18; F04B 2027/1813; F04B 2027/1827; Y10T 137/87869; Y10T 137/7762; Y10T 137/7764; Y10T 137/87338; Y10T 137/87491; Y10T 137/7937; Y10T 137/87265; Y10T 137/87281
See application file for complete search history.

(56) References Cited

U.S. PATENT DOCUMENTS 1,510,161 A * 9/1924 Raymond ............. F04B 49/225
137/492.5
1,796,796 A * 3/1931 Le Valley ............. F04B 49/225
137/543.15
2,741,424 A * 4/1956 Ploeger ................... F25B 31/02
417/228

(Continued)

FOREIGN PATENT DOCUMENTS

JP          H10131852 A       5/1998

Primary Examiner — Mary McManmon
Assistant Examiner — David Colon Morales
(74) Attorney, Agent, or Firm — Fraser Clemens Martin & Miller LLC; James D. Miller

(57) ABSTRACT

A variable displacement compressor for an air conditioning system includes a suction throttle valve. The suction throttle valve includes a housing with a cavity formed therein. A first piston reciprocatingly disposed in the cavity is configured to cause a variable restriction of a flow of refrigerant through a suction inlet formed in the housing. The suction inlet provides fluid communication between a suction port and the cavity formed in the housing. The refrigerant flows through the suction port in a direction that is not parallel to a direction the piston reciprocates within the cavity. The suction throttle valve is configured to increase the restriction in the suction inlet when a crankcase pressure associated with the variable displacement compression is increased relative to an external suction pressure of the refrigerant entering the suction throttle valve.

19 Claims, 2 Drawing Sheets

(51) Int. Cl.
*F16K 15/02* (2006.01)
*F16K 17/04* (2006.01)
*F16K 17/08* (2006.01)

(56) References Cited

U.S. PATENT DOCUMENTS

| | | | | |
|---|---|---|---|---|
| 3,107,688 A * | 10/1963 | Caslow | ...................... | F16K 47/00 137/489 |
| 4,691,526 A * | 9/1987 | Kobayashi | ........... | B60H 1/3205 417/269 |
| 5,785,502 A * | 7/1998 | Ota | ..................... | F04B 27/1036 417/222.1 |
| 5,988,988 A * | 11/1999 | Tokumasu | .......... | F04B 27/1804 137/489.5 |
| 6,045,337 A * | 4/2000 | Tokumasu | .......... | F04B 27/1804 417/213 |
| 6,149,397 A * | 11/2000 | Mizutani | ............. | F04B 27/1036 417/222.2 |
| 6,257,848 B1 | 7/2001 | Terauchi | | |
| 6,435,848 B1 * | 8/2002 | Minami | .............. | F04B 27/1804 137/514.5 |
| 6,481,977 B2 * | 11/2002 | Mameda | ............. | F04B 27/1804 417/222.2 |
| 6,520,751 B2 * | 2/2003 | Fujita | ................. | F04B 27/1804 137/513.3 |
| 6,572,341 B2 * | 6/2003 | Kimura | .............. | F04B 27/1804 251/129.02 |
| 6,755,625 B2 * | 6/2004 | Breeden | ................ | F04B 49/225 123/179.17 |
| 6,953,325 B2 * | 10/2005 | Weber | ................. | F04B 27/1036 137/513.7 |
| 7,014,428 B2 * | 3/2006 | Pitla | .................... | F04B 27/1804 184/26 |
| 7,021,901 B2 * | 4/2006 | Hirota | ................ | F04B 27/1804 417/222.2 |
| 7,204,098 B2 * | 4/2007 | Yamada | ................ | F04B 27/109 417/222.2 |
| 7,651,321 B2 * | 1/2010 | Ota | ..................... | F04B 27/1804 417/222.2 |
| 7,918,656 B2 | 4/2011 | Hibino et al. | | |
| 7,931,452 B2 | 4/2011 | Hibino et al. | | |
| 7,972,119 B2 | 7/2011 | Ozeki et al. | | |
| 2004/0062660 A1 * | 4/2004 | Kazahaya | .......... | F04B 27/1804 417/222.1 |
| 2008/0199328 A1 | 8/2008 | Hayashi et al. | | |
| 2008/0199329 A1 | 8/2008 | Hayashi et al. | | |
| 2009/0136366 A1 * | 5/2009 | Taguchi | .............. | F04B 27/1081 417/312 |
| 2009/0205347 A1 | 8/2009 | Cochran et al. | | |
| 2009/0311109 A1 | 12/2009 | Bona et al. | | |
| 2010/0062890 A1 * | 3/2010 | Shimizu | ................ | F15B 11/05 475/161 |
| 2010/0143162 A1 | 6/2010 | Warren | | |
| 2011/0020147 A1 * | 1/2011 | Onda | ................. | F04B 27/1804 417/269 |
| 2011/0139273 A1 * | 6/2011 | Park | .................... | F04B 27/1009 137/535 |

* cited by examiner

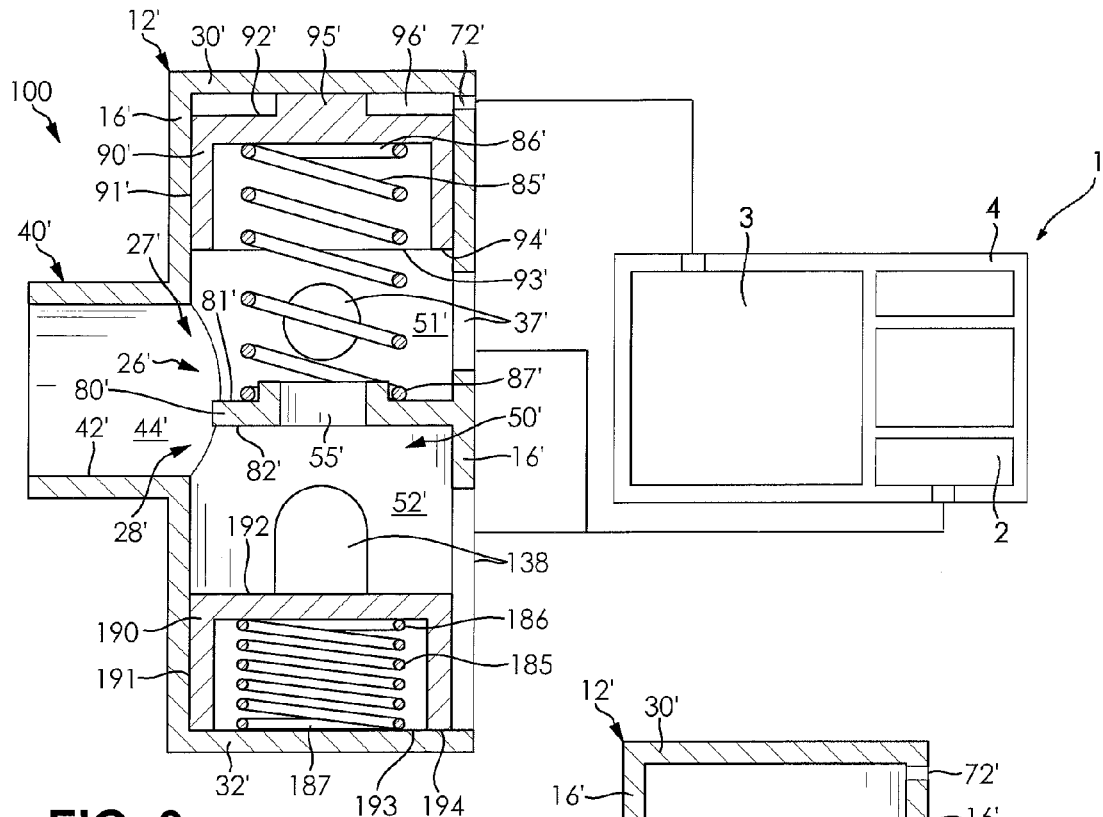
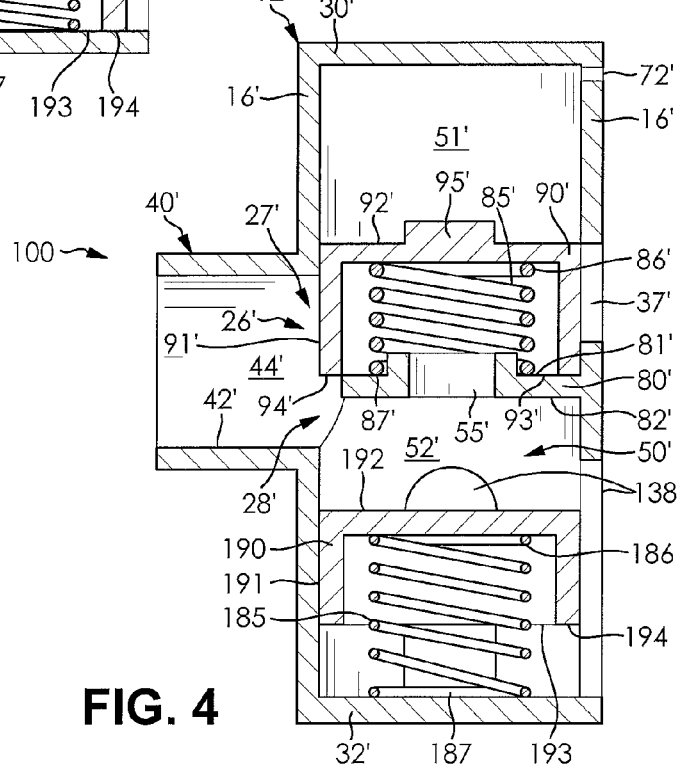
FIG. 3
FIG. 4

VARIABLE SUCTION DEVICE FOR AN A/C COMPRESSOR TO IMPROVE NVH BY VARYING THE SUCTION INLET FLOW AREA

FIELD OF THE INVENTION

The invention relates to a variable displacement compressor for an air conditioning system in a motor vehicle, and more specifically to a variable area valve that attenuates vibration and noise development due to pulsations caused by the variable displacement compressor.

BACKGROUND OF THE INVENTION

Variable displacement compressors for use in an air conditioning system of a motor vehicle are known in the art. A variable displacement compressor generally comprises a swash plate that is varied between a minimum angle and a maximum angle and at least one piston disposed in a cylinder. Each piston engages the swash plate so the angle of the swash plate as it is rotated relative to the at least one piston causes the piston to reciprocate within the cylinder. Each cylinder contains a refrigerant gas that is compressed by the piston within the cylinder. As the angle of the swash plate is varied, so too is the displacement of each piston within each cylinder, thereby causing a flow rate of the refrigerant flowing through the compressor to also vary. The flow rate varies between a maximum flow rate when the swash plate is positioned at a maximum angle and a minimum flow rate when the swash plate is positioned at a minimum angle.

When the flow rate of the refrigerant is low, such variable displacement compressors may develop suction induced pulsation due to the opening and closing of reeds included within the variable displacement compressor. The suction pressure pulsations may propagate throughout the air conditioning system. When these pressure pulsations reach certain components of the air conditioning system, such as the evaporator, the pressure pulsations may cause noise to be generated that can be heard in a passenger compartment of the vehicle.

The problem of noise generation caused by suction pulsation has conventionally been addressed by adding a muffler or silencer to a portion of the piping contained within the air conditioning system. However, such mufflers or silencers typically add cost to producing the air conditioning system while also providing additional space constraints.

It would therefore be desirable to produce a suction throttle valve that minimizes noise generation in an air conditioning system by providing a variable restriction of a refrigerant flow as the refrigerant enters a suction port of the compressor.

SUMMARY OF THE INVENTION

Compatible and attuned with the present invention, a suction throttle valve for use in a variable displacement compressor that minimizes noise generation by causing a variable restriction of a refrigerant flow into the compressor has surprisingly been discovered.

In one embodiment of the invention, a suction throttle valve for a variable displacement compressor having a compressor housing including a crankcase chamber and a suction chamber formed therein is disclosed. The suction throttle valve comprises a housing with a cavity formed therein, the housing including a suction inlet formed therein. The suction throttle valve further includes a suction port extending laterally from the housing, wherein the suction inlet formed in the housing provides fluid communication between the suction port and the cavity formed in the housing. The suction throttle valve also includes a first piston reciprocatingly disposed in the cavity, wherein the first piston is configured to cause a variable restriction of the suction inlet as it slides within the cavity of the housing. A first fluid flowing through the suction port flows in a direction that is not parallel to a direction the first piston is caused to reciprocate within the cavity of the housing.

In a second embodiment of the invention, a suction throttle valve for a variable displacement compressor having a compressor housing including a crankcase chamber and a suction chamber formed therein is disclosed. The suction throttle valve includes a housing with a cavity formed therein, the housing including a suction inlet formed therein. The suction throttle valve also includes a suction port extending laterally from the housing, wherein the suction inlet formed in the housing provides fluid communication between the suction port and the cavity formed in the housing. A partition extends laterally from a sidewall of the housing and divides the cavity into a first chamber and a second chamber while also dividing the suction inlet into a first suction inlet and a second suction inlet. A first piston is reciprocatingly disposed in the first chamber of the cavity, wherein the first piston is configured to cause a variable restriction of the first suction inlet as the first piston slides within the first chamber of the cavity. A first fluid flowing through the suction port flows in a direction that is not parallel to a direction the first piston reciprocates within the first chamber of the cavity.

In yet another embodiment of the invention, a suction throttle valve for a variable displacement compressor having a compressor housing including a crankcase chamber and a suction chamber formed therein is disclosed. The suction throttle valve includes a housing including a cavity formed therein, the housing further including a suction inlet formed therein. The suction throttle valve further includes a suction port extending laterally from the housing, the suction inlet providing fluid communication between the suction port and the cavity. A first piston is reciprocatingly disposed in the cavity, the first piston having a first end and a second end, the first end in fluid communication with the crankcase chamber and the second end in fluid communication with the suction port. A first spring urges the first piston in a direction away from the suction inlet formed in the housing. The first piston moves toward the suction inlet to cause a variable restriction of the suction inlet when a force applied to the first end of the first piston caused by a pressure of a first fluid originating from the crankcase chamber exceeds a force applied to the second end of the first piston caused by a pressure of a second fluid flowing through the suction port and the urging of the first spring. The suction port is not arranged in parallel to a direction the first piston reciprocates within the cavity.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawing which:

FIG. 3 is a cross-sectional side elevational view of a suction throttle valve for a variable displacement compressor according to a second embodiment of the present disclosure, wherein the suction throttle valve is shown in a fully open position; and FIG. 4 is a cross-sectional side elevational view of the suction throttle valve of FIG. 3, wherein the suction throttle valve is shown in a restricted position.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
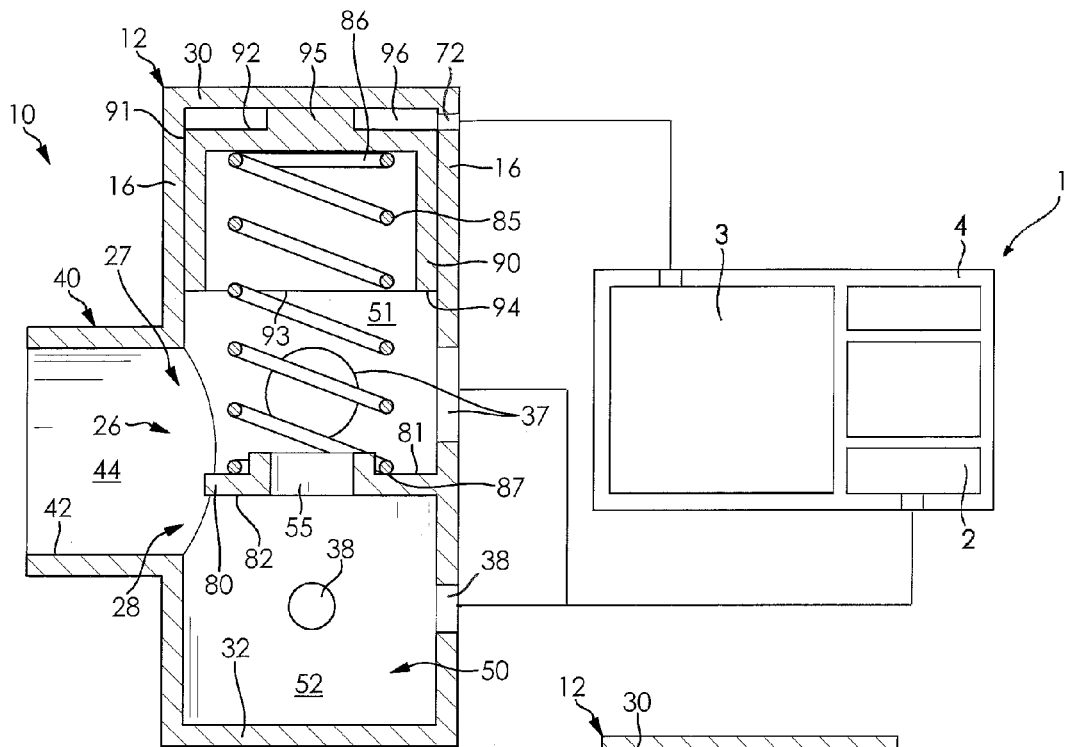
FIG. 1 is a cross-sectional side elevational view of a suction throttle valve for a variable displacement compressor according to an embodiment of the present disclosure, wherein the suction throttle valve is shown in a fully open position.

FIG. 1 shows an embodiment of a suction throttle valve 10. The suction throttle valve 10 is adapted for use in a variable displacement compressor 1 forming a component of a refrigeration cycle for use in an air conditioning system of a motor vehicle. The suction throttle valve 10 is typically located at an entrance of the variable displacement compressor 1 adjacent a suction chamber 2 formed in a housing 4 of the variable displacement compressor 1. The variable displacement compressor 1 may also include a crankcase chamber 3 formed in the housing 4 of the compressor 1. The variable displacement compressor 1 may be a variable displacement compressor such as is disclosed in Pitla et al. (U.S. Pat. No. 7,014,428), hereby incorporated herein by reference in its entirety.

The suction throttle valve 10 includes a housing 12. The housing 12 is a hollow structure having a first end wall 30, a second end wall 32, and at least one side wall 16. The side wall 16 is interposed between the first end wall 30 and the second end wall 32. Interior surfaces of the walls 16, 30, 32 cooperate to define a cavity 50 within the housing 12. As shown, the cavity 50 is substantially cylindrical in shape, but it should be understood that the cavity 50 may have any geometry without departing from the scope of the invention. In the case of a cylindrical cavity 50, the side wall 16 includes one substantially continuous surface extending around a circumference of an interior of the housing 12. If other geometries are used, the side wall 16 may be comprised of a plurality of side walls connecting the first end wall 30 and the second end wall 32. A longitudinal axis of the suction throttle valve 10 extends in a direction running from the first end wall 30 the second end wall 32 of the housing 12.

A suction port 40 extends in a lateral direction from the housing 12 that is not co-axial or parallel with the longitudinal axis of the suction throttle valve 10. The suction port 40 is depicted in FIG. 1 as being arranged substantially perpendicular to the longitudinal axis of the suction throttle valve 10, but any arrangement may be used that does not include the suction throttle valve 10 and the suction port 40 being co-axial or arranged in parallel. The suction port 40 typically functions as an inlet into the variable displacement compressor 1 for a refrigerant flowing through the refrigeration cycle. The suction port 40 is hollow and includes an inner surface 42 defining a flow channel 44 for receiving the refrigerant therein. The flow channel 44 of the suction port 40 leads to a suction inlet 26. The suction inlet 26 is an aperture formed in the side wall 16 of the housing 12. The suction inlet 26 provides fluid communication between the flow channel 44 formed in the suction port 40 and the cavity 50 formed within the housing 12 of the suction throttle valve 10. The suction port 40 shown is substantially cylindrical in shape, but any geometry may be used without departing from the scope of the invention.

A partition 80 extends laterally outwardly from the side wall 16 and divides the cavity 50 into a first chamber 51 and a second chamber 52. As shown in FIG. 1, the partition 80 is arranged substantially perpendicular to the longitudinal axis of the suction throttle valve 10 while substantially spanning the cavity 50. The partition 80 includes a first surface 81 in facing relationship with the first end wall 30 of the housing 12 and a second surface 82 in facing relationship with the second end wall 32 of the housing 12. A position of the partition 80 within the housing 12 effectively divides the suction inlet 26 into a first suction inlet 27 and a second suction inlet 28. The first suction inlet 27 provides fluid communication between the flow channel 44 of the suction port 40 and the first chamber 51 of the cavity 50. The second suction inlet 28 provides fluid communication between the flow channel 44 of the suction port 40 and the second chamber 52 of the cavity 50. It should be understood that the partition 80 affects a distribution of the refrigerant entering the first chamber 51 and the second chamber 52 from the flow channel 44 of the suction port 40 due to a variation in a cross-sectional flow area of the first suction inlet 27 and the second suction inlet 28.

The partition 80 may be disposed on or coupled to a shoulder extending inwardly from the side wall 16 of the housing 12. When the cavity 50 is substantially cylindrical, the shoulder may extend around at least a portion of a circumference of the side wall 16 of the housing 12 with the exception of the suction inlet 26 formed therein. Alternatively, the partition 80 and the side wall 16 of the housing 12 may be formed integrally or may be coupled to each other by any known method, such as welding.

The partition 80 further includes at least one aperture 55 formed therethrough, providing fluid communication between the first chamber 51 of the cavity 50 and the second chamber 52 thereof. The aperture 55 may be formed in a central region of the partition 80 or adjacent a peripheral edge thereof.

A first piston 90 is reciprocatingly disposed within the first chamber 51 of the cavity 50. The first piston 90 spans the cross-section of the cavity 50, contacting at least a portion of the side wall 16 of the housing 12 around a peripheral surface 91 of the first piston 90. The first piston 90 as shown is a hollow structure having a closed first end 92 and an open second end 93, causing the first piston 90 to have a shape resembling a cap. The open second end 93 of the first piston 90 includes a seating surface 94 in facing relationship with the first surface 81 of the partition 80. When the cavity 50 is substantially cylindrical, the first piston 90 is substantially cylindrical and the seating surface 94 thereof is an annular ring.

The first end 92 of the first piston 90 may include a protuberance 95 projecting therefrom. When the protuberance 95 of the first piston 90 abuts the first end wall 30 as shown in FIG. 1, the protuberance 95 causes a remainder of the first end 92 of the piston 90 to be spaced from the first end wall 30, thereby creating an open space 96 formed around the protuberance 95 between the first end 92 of the first piston 90 and the first end wall 30 of the housing 12. A pressure inlet 72 is formed in the side wall 16 of the housing 12 adjacent the first end wall 30. The pressure inlet 72 may also be formed in the first end wall 30 of the housing, if desired.

The pressure inlet 72 provides fluid communication between the open space 96 and a source of pressurized refrigerant (not shown) located exterior to the suction throttle valve 10. The source of pressurized refrigerant may include the crankcase chamber 3 formed in a housing 4 of the variable displacement compressor 1. The crankcase chamber 3 supplies refrigerant having a crankcase pressure $P_c$.

A first spring 85 is disposed between the partition 80 and the first piston 90. A first end 86 of the first spring 85 is in contact with an inner surface of the the first piston 90 adjacent the first end 92 thereof and a second end 87 of the first spring 85 is seated on the first surface 81 of the partition 80. The first spring 85 is configured to urge the first piston 90 in a direction toward the first end wall 30 of the housing 12 and away from the suction inlet 26 formed in the housing 12.

The first chamber 51 of the cavity 50 includes at least one first outlet 37 formed in the side wall 16 of the housing 12. The second chamber 52 of the cavity 50 includes at least one second outlet 38 formed in the side wall 16. The at least one first outlet 37 provides fluid communication between the first chamber 51 of the cavity 50 and a suction chamber 2 formed in a housing 4 of the variable displacement compressor 1 exterior to the suction throttle valve 10. The at least one second outlet 38 provides fluid communication between the second chamber 52 of the cavity 50 and the suction chamber 2. Each of the at least one first outlets 37 is formed in the side wall 16 of the housing 12 to cause the outer peripheral surface 91 of the first piston 90 to block each of the at least one first outlets 37 when the first piston 90 is seated on the first surface 81 of the partition 80. Accordingly, each of the at least one first outlets 37 may be aligned with each other in the axial direction along the side wall 16 of the housing 12.

Operation of the variable displacement compressor 1 and the suction throttle valve 10 is dependent on the difference in pressure between the crankcase pressure $P_c$ found in the crankcase chamber 3 and an internal suction pressure $P_{ins}$ found in the suction chamber 2. When the variable displacement compressor 1 is initially operated after a period of inactivity, there exists very little pressure difference between the various components of the compressor 1, causing $P_{ins}$ and $P_c$ to have substantially the same values. When the compressor 1 is operated at a maximum or near maximum displacement to cause a maximum or near maximum flow rate of the refrigerant through the compressor 1, $P_{ins}$ and $P_c$ are also approximately equal. As the compressor 1 continues to operate at a maximum or near maximum displacement, the first piston 90 will remain in a direction toward the first end wall 30.

In use, refrigerant is caused to flow into the suction port 40 having an external suction pressure $P_{exs}$. The refrigerant entering the suction port 40 may originate from an evaporator (not shown) disposed upstream of the variable displacement compressor 1 as part of an air conditioning system, meaning that $P_{exs}$ may be substantially equal to a pressure of the refrigerant leaving the evaporator. The refrigerant flows through the flow channel 44 formed in the suction port 40 in a direction that is not parallel to the direction the first piston 90 reciprocates within the first chamber 51 of the cavity 50. The refrigerant enters the suction throttle valve 10 through the suction inlet 26, causing the pressure within the first and second chambers 51, 52 of the cavity 50 to also be substantially equal to $P_{exs}$. The refrigerant exits the suction throttle valve 10 and enters the suction chamber 2 through the first outlet 37 and the second outlet 38. After passing through the suction throttle valve 10, the refrigerant may experience a slight pressure drop, causing $P_{ins}$ of the refrigerant within the suction chamber 2 to be slightly lower than $P_{exs}$. The pressure difference between $P_{ins}$ and $P_{exs}$ is typically below 2 p.s.i., causing the difference between $P_{ins}$ and $P_{exs}$ to be essentially negligible in respect of operation of the suction throttle valve 10 during maximum displacement operation of the variable displacement compressor 1.

The refrigerant within the first chamber 51 of the cavity 50 at $P_{exs}$ applies a force on the first piston 90 in a direction toward the first end wall 30 and away from the partition 80. As described hereinabove, the first spring 85 also urges the first piston 90 in a direction toward the first end wall 30, even when the first piston 90 is abutting the first end wall 30. Accordingly, the first piston 90 is urged in a direction toward the first end wall 30 and away from the partition 80 by a combined force of the refrigerant at pressure $P_{exs}$ and the first spring 85. A pressure of the refrigerant located within the open space 96 exerts a force on the first end 92 of the first piston 90, thereby urging the first piston 90 in a direction away from the first end wall 30 of the housing 12 and toward the partition 80. The first piston 90 moves in a direction toward the partition 80 when the force applied to the first end 92 of the first piston 90 exceeds the combined force of the first spring 85 and the refrigerant at pressure $P_{exs}$ applied to the second end 93 of the first piston 90. Accordingly, the first piston 90 will always remain in contact with the first end wall 30 until a value of $P_c$ exceeds a value of $P_{exs}$.

Accordingly, the first piston 90 is configured to cause a variable restriction of the suction inlet 26 as the first piston 90 slides within the cavity 50 of the housing 12 due to the pressure difference between $P_{exs}$ and $P_c$. More specifically, the first piston 90 causes a variable restriction of the first suction inlet 27, causing the refrigerant flowing through the suction valve 10 to be unequally distributed to the first chamber 51 and the second chamber 52 of the cavity 50. Furthermore, the first piston 90 is also configured to cause a variable restriction of the at least one of the first outlets 37 formed in the side wall 16 of the housing 12.

FIG. 1 illustrates the suction throttle valve 10 in a fully open position, allowing for a maximum volume of refrigerant to both enter and exit the suction throttle valve 10 during operation of the variable displacement compressor 1. Operation of the suction throttle valve 10 in the fully open position indicates that the force caused by $P_c$ acting on the first end 92 of the first piston 90 does not exceed the combined forces of $P_{exs}$ and the urging of the first spring 85 acting on the first piston 90.

When in the fully open position, the protuberance 95 formed on the first piston 90 abuts the first end wall 30 of the housing 12. The first spring 85 continues to urge the first piston 90 in a direction toward the first end wall 30, ensuring that the suction throttle valve 10 remains open. The suction inlet 26 is fully open and not blocked by the first piston 90, allowing for flow through both the first suction inlet 27 and the second suction inlet 28. Each of the at least one first outlets 37 is also fully open and not restricted by the first piston 90, allowing for a maximum volume of fluid to flow through each of the at least one first outlets 37. Each of the at least one second outlets 38 is also continuously open, meaning that fluid is allowed to flow through all of the first outlet 37 and the second outlet 38 formed in the side wall 16 of the housing 12.

Figure 2:
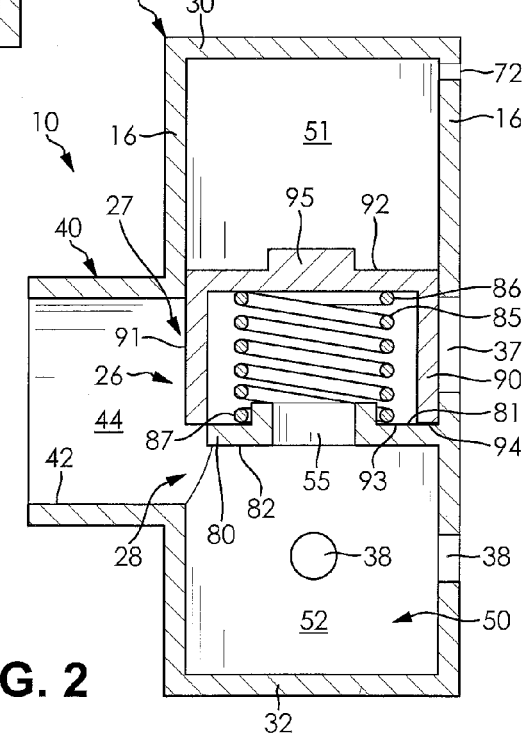
FIG. 2 is a cross-sectional side elevational view of the suction throttle valve of FIG. 1, wherein the suction throttle valve is shown in a position restricting flow therethrough.

FIG. 2 shows the suction throttle valve 10 when in a fully restricted position, allowing for a minimum volume of the refrigerant to both enter and exit the suction throttle valve 10 during operation of the variable displacement compressor 1. Operation of the suction throttle valve 10 in the fully restricted position indicates that the force caused by $P_c$ acting on the first end 92 of the first piston 90 exceeds the combined forces of $P_{exs}$ and the urging of the first spring 85 acting on the first piston 90.

The fully restricted position includes the seating surface 94 of the first piston 90 abutting the first surface 81 of the partition 80, seating the first piston 90 on the partition 80. The first piston 90 blocks passage to the at least one first outlet 37 when the suction throttle valve 10 is in the fully restricted position. Furthermore, the first piston 90 also blocks passage through the first suction inlet 27 to the first chamber 51. Accordingly, the refrigerant only enters the cavity 50 through the second suction inlet 28, restricting the cross-sectional area through which the refrigerant may exit the suction port 40 and enter the suction throttle valve 10. The cross-sectional area through which the refrigerant may exit the cavity 50 is also limited to the total combined cross-sectional area of all of the at least one second outlets 38 formed in the side wall 16 of the housing 12.

The first piston 90 may also be disposed at a position intermediate the fully open and fully restricted positions. It should be understood that a spring constant of the first spring 85 causes the first spring 85 to deliver a variable force to the first piston 90 as the first piston 90 moves within the first chamber 51 of the cavity 50 between the first end wall 30 of the housing 12 and the partition 80. Accordingly, the first piston 90 may be disposed at an intermediate position between the first end wall 30 and the partition 80 when the forces applied to each side of the first piston 90 are substantially equal. When in an intermediate position, the first piston 90 may obstruct at least a portion of the first suction inlet 27 and the at least one first outlet 37, causing a cross-sectional area of each of the first suction inlet 27 and the at least one first outlet 37 to vary depending on the position of the first piston 90 within the first chamber 51. However, it has been observed that during operation of the variable displacement compressor 1 the first piston 90 tends to rapidly alternate between the fully open and the fully restricted positions due to the rapidly changing pressures within the associated components of the compressor 1.

FIGS. 3 and 4 illustrate an alternative embodiment of a suction throttle valve 100 according to the invention. The suction throttle valve 100 is identical to the suction throttle valve 10 except for the addition of a second piston 190 and a modification of the second outlet 38 formed in the second chamber 52 of the cavity 50. Structure similar to that illustrated in FIGS. 1 and 2 includes the same reference numeral and a prime (') symbol for clarity. The second piston 190 is reciprocatingly disposed within the second chamber 52' of the cavity 50'. The second piston 190 spans the cross-section of the cavity 50' within the second chamber 52', contacting at least a portion of the side wall 16' of the housing 12' around an outer peripheral surface 191 of the second piston 190. The second piston 190 is a hollow structure having a closed first end 192 and an open second end 193. The open second end 193 of the second piston 190 includes a seating surface 194 in facing relationship with the second end wall 32'. When the cavity 50' is substantially cylindrical, the second piston 190 is cylindrical and includes an annular seating surface 194.

A second spring 185 is disposed between the second piston 190 and the second end wall 32' of the housing 12'. A first end 186 of the second spring 185 contacts the second piston 190 while a second end 187 of the second spring 185 is seated on the second end wall 32' of the housing 12'. The second spring 185 is configured to urge the second piston 190 in a direction toward the partition 80' and away from the second end wall 32'.

The suction throttle valve 100 further includes at least one second outlet 138 formed in the side wall 16' of the housing 12' within the second chamber 52' of the cavity 50'. The at least one second outlet 138 provides fluid communication between the second chamber 52' of the cavity 50' and the suction chamber 2. The second outlet 138 may have a larger cross-sectional flow area than the second outlet 38 of the suction throttle valve 10 illustrated in FIGS. 1-2. The second outlet 138 is shown in FIG. 3 as an elongate aperture or slot extending to an interface between the side wall 16' and the second end wall 32' of the housing 12'.

The suction throttle valve 100 operates in similar fashion to the suction throttle valve 10. The open space 96' formed between the first piston 90' and the first end wall 30' of the housing 12' is in fluid communication with the crankcase chamber 3 having refrigerant at pressure $P_c$. When the force applied to the first end 92' of the first piston 90' does not exceed the combined forces of the spring 85' and the external suction pressure $P_{exs}$ applied to the first piston 90', the suction throttle valve 100 is in the fully open position. When the force applied to the first end 92' of the first piston 90' exceeds the combined forces of the spring 85' and the external suction pressure $P_{exs}$ applied to the first piston 90', the first piston 90' is caused to move in a direction toward the partition 80'.

FIG. 3 illustrates the suction throttle valve 100 when in the fully open position. The protuberance 95' of the first piston 90' abuts the first end wall 30' of the housing 12'. The piston 90' is not blocking the at least one first outlet 37' formed in the side wall 16' of the housing 12' to allow for maximum refrigerant flow out of the suction throttle valve 100 through the at least one first outlet 37'. The suction inlet 26' is also unobstructed, allowing for maximum flow through both the first suction inlet 27' and the second suction inlet 28'.

As refrigerant flows through the suction inlet 26', at least a portion of the refrigerant will flow through the second chamber 52' of the cavity 50' to exit the suction throttle valve 10 through the at least one second outlet 138. The at least a portion of the refrigerant flowing through the second chamber 52' applies a force to the first end 192 of the second piston 190, causing the second piston 190 to be urged in a direction toward the second end wall 32' of the housing 12'. The second spring 185 is configured to urge the second piston 190 in a direction toward the partition 80', causing the second piston 190 to variably restrict the at least one second outlet 138. Accordingly, the second spring 185 may be selected to have a spring constant that permits the force of the refrigerant flow on the first end 192 of the second piston 190 to overcome the force applied to the second piston 190 by the spring 185, causing the second piston 190 to be seated on the second end wall 32' when a predetermined volumetric flow rate of the refrigerant flowing through the second chamber 52' of the cavity 50' encounters the first end 192 of the second piston 190.

FIG. 3 illustrates the second piston 190 as being disposed at a position within the second chamber 52' of the cavity 50' such that the at least one second outlet 138 encounters the least restriction. The second surface 194 of the second piston 190 abuts the interior second surface 32' of the housing 12'. A portion of the at least one second outlets 138 is covered by the second piston 190 while another portion of the at least one second outlets 138 is unobstructed by the second piston 190, allowing for refrigerant to flow through the portion of the at least one first outlet 138 not obstructed by the second piston 190. The at least one second outlet 138 has a maximum cross-sectional area exposed for allowing the refrigerant to flow therethrough when the second piston 190 is seated on the second end wall 32', despite only a portion of the at least one second outlet 138 being unobstructed.

FIG. 4 illustrates the suction throttle valve 100 in a fully restricted position, indicating that the pressure found in the open space 96' exerts a force on the first piston 90' exceeding the combined forces of the external suction pressure $P_{exs}$ and the first spring 85'. The fully restricted position includes the first piston 90' being seated on the first surface 81' of the partition 80'. The peripheral surface 91 of the first piston 90' blocks passage through the at least one first outlet 37'. Furthermore, the first piston 90' also blocks passage through the first suction inlet 27'. Accordingly, the refrigerant enters the cavity 50' through the second suction inlet 28' and exits the cavity 50' through the at least one second outlet 138.

The suction throttle valve 100 operating at the fully restricted position typically encounters refrigerant flowing at a lower volumetric flow rate than does the suction throttle valve 100 operating at the fully open position. The lower volumetric flow rate of the refrigerant may cause the refrigerant to apply a lower force on the first end 192 of the second piston 190, thereby preventing the second piston 190 from moving to a position where the second piston 190 is seated on the second end wall 32'. Accordingly, a position of the second piston 190 may vary between the second piston 190 being seated on the second end wall 32' and being disposed at a position within the second chamber 52' where the second spring 185 is substantially uncompressed. The position of the second spring 190 accordingly depends on the instantaneous volumetric flow rate of the refrigerant through the suction throttle valve 100. FIG. 4 illustrates the second spring 185 as experiencing substantially no compression, meaning the refrigerant is flowing through the suction throttle valve 100 at a relatively low volumetric flow rate incapable of causing the second piston 190 to be forced toward the second end wall 32' of the housing 12'. When not under compression, the second piston 190 obstructs a maximum portion of the at least one second outlets 138 formed in the second chamber 52' of the cavity 50', greatly reducing the combined cross-sectional area of all of the at least one second outlets 138 formed in the housing 12'.

As shown in FIG. 4, when the second piston 190 is not seated on the second end wall 32', a portion of each of the at least one second outlets 138 is also exposed beyond the seating surface 194 of the second piston 190, causing the second end 193 of the second piston 190 to be in fluid communication with the suction chamber 2 having the internal suction pressure $P_{ins}$. Accordingly, the first end 192 of the second piston 190 experiences a pressure of $P_{exs}$ and the second end 193 of the second piston 190 experiences a pressure of $P_{ins}$. However, as explained hereinabove, the pressure difference between $P_{exs}$ and $P_{ins}$ is typically less than 2 p.s.i. Accordingly, the effect of the pressure difference between $P_{exs}$ and $P_{ins}$ is negligible when compared to the force the flow of the refrigerant exerts on the first end 192 of the second piston 190.

The second spring 185 may also be selected wherein the first end 192 of the second piston 190 is disposed beyond an end of the at least one second outlet 138 formed in the side wall 16' of the housing 12' when the second spring 185 is substantially uncompressed. In such cases, the flow of the refrigerant at $P_{exs}$ through the suction throttle valve 100 causes the second piston 190 to move in a direction toward the second end wall 32' of the housing 12', allowing the at least one second outlet 138 to vary between allowing no refrigerant to flow therethrough and allowing a maximum amount of refrigerant to flow therethrough.

The suction throttle valve 100 is depicted in FIG. 3 as having a pair of the at least one first outlets 37' formed in the housing 12'. However, the suction throttle valve 100 may operate without the at least one first outlet 37', instead causing the refrigerant to exit the suction throttle valve 100 exclusively through the at least one second outlet 138. In such cases, a position of the first end 192 of the second piston 190 when experiencing no deflection may be selected to allow for a larger portion of the at least one second outlet 138 to be exposed. Additionally, the spring constant for the second spring 185 may be selected to allow the second piston 190 to be more easily moved toward the second end wall 32' of the housing 12' during periods of low volumetric flow of the refrigerant. Furthermore, a size of each of the at least one second outlets 138 may be increased to accommodate for the cross-sectional flow area lost by the exclusion of the at least one first outlet 37'.

Each of the suction throttle valve 10 and the suction throttle valve 100 provide for a variable restriction of the refrigerant flowing therethrough depending on a degree of displacement of the variable displacement compressor 1. The degree of compressor displacement and subsequently the volumetric flow rate of the refrigerant are largely dependent on a pressure difference between $P_{ins}$ and $P_c$. When the difference in pressure between $P_{ins}$ and $P_c$ is low and the refrigerant flow rate tends to be relatively high as a consequence, it is advantageous for each of the suction throttle valves 10, 100 to operate in the frilly open position. When the difference in pressure between $P_{ins}$ and $P_c$ is high and the refrigerant flow rate tends to be relatively low as a consequence, it is advantageous for each of the suction throttle valves 10, 100 to operate in a restricted position to prevent a generation of noise within a suction reed valve of the variable displacement compressor 1. This relationship between $P_{ins}$ and $P_c$ allows for each of the suction throttle valves 10, 100 to respond to the difference in pressure between $P_{ins}$ and $P_c$ effectively and quickly when the pressure inlet 72, 72' is in fluid communication with the crankcase chamber 3 having the pressure of $P_c$. The ability of each suction throttle valve 10, 100 to restrict the flow of refrigerant therethrough aids in reducing pressure pulsations that may propagate through the air conditioning system having the variable displacement compressor 1.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A suction throttle valve for a variable displacement compressor having a compressor housing including a crankcase chamber and a suction chamber formed therein, the suction throttle valve comprising:
   a valve housing with a cavity formed therein, the valve housing including a suction inlet formed therein;

a suction port extending laterally from the valve housing, wherein the suction inlet provides fluid communication between the suction port and the cavity formed in the valve housing;

a first piston reciprocatingly disposed in the cavity, wherein the first piston is configured to cause a variable restriction of the suction inlet as the first piston reciprocates within the cavity of the valve housing; and a partition dividing the cavity into a first chamber and a second chamber and dividing the suction inlet into a first suction inlet and a second suction inlet, wherein a first fluid flowing through the suction port flows in a direction that is not parallel to a direction the first piston reciprocates in the cavity of the valve housing.

2. The suction throttle valve of claim 1, wherein the first piston causes a variable restriction of an outlet formed in the valve housing, the outlet providing fluid communication between the cavity of the valve housing and the suction chamber.

3. The suction throttle valve of claim 1, wherein the first piston is disposed in the first chamber of the cavity and the first piston causes a variable restriction of the first suction inlet.

4. The suction throttle valve of claim 3, wherein the first piston also causes a variable restriction of an outlet formed in the valve housing, the outlet providing fluid communication between the first chamber of the cavity and the suction chamber.

5. The suction throttle valve of claim 1, wherein the partition includes an aperture formed therein, the aperture providing fluid communication between the first chamber and the second chamber.

6. The suction throttle valve of claim 1, wherein a first end of the first piston is in fluid communication with a source of pressurized fluid via a pressure inlet formed in the valve housing and a second end of the first piston is in fluid communication with the first fluid flowing through the suction port.

7. The suction throttle valve of claim 6, wherein the source of pressurized fluid is the crankcase chamber.

8. The suction throttle valve of claim 1, wherein a first spring disposed in the cavity of the valve housing urges the first piston in a direction away from the suction inlet formed in the valve housing.

9. The suction throttle valve of claim 8, wherein the first spring is compressed when a force applied to a first end of the first piston caused by a pressure of a second fluid in fluid communication with the first end of the first piston overcomes a force applied to a second end of the first piston caused by the first spring and a pressure of the first fluid.

10. The suction throttle valve of claim 1, further including a second piston reciprocatingly disposed in the cavity of the valve housing, the second piston configured to cause a variable restriction of an outlet formed in the valve housing.

11. The suction throttle valve of claim 10, wherein the second piston restricts the outlet formed in the valve housing when a force applied to a first end of the second piston caused by a flow of the first fluid overcomes a force applied to a second end of the second piston by a second spring disposed in the cavity of the valve housing.

12. A suction throttle valve for a variable displacement compressor having a compressor housing including a crankcase chamber and a suction chamber formed therein, the suction throttle valve comprising:

a valve housing with a cavity formed therein, the valve housing including a suction inlet formed therein;

a suction port extending laterally from the valve housing, wherein the suction inlet formed in the valve housing provides fluid communication between the suction port and the cavity formed in the valve housing;

a partition extending laterally from a sidewall of the valve housing, the partition dividing the cavity into a first chamber and a second chamber and dividing the suction inlet into a first suction inlet and a second suction inlet;

a first piston reciprocatingly disposed in the first chamber of the cavity, wherein the first piston is configured to cause a variable restriction of the first suction inlet as the first piston reciprocates within the first chamber of the cavity;

wherein a first fluid flowing through the suction port flows in a direction that is not parallel to a direction the first piston reciprocates within the first chamber of the cavity.

13. The suction throttle valve of claim 12, wherein the valve housing further includes a first outlet and a second outlet formed therein; wherein the first outlet provides fluid communication between the first chamber of the cavity and the suction chamber and the second outlet provides fluid communication between the second chamber of the cavity and the suction chamber.

14. The suction throttle valve of claim 13, wherein the first piston is also configured to cause a variable restriction of the first outlet when the first piston reciprocates within the first chamber of the cavity.

15. The suction throttle valve of claim 12, wherein the valve housing further includes a pressure inlet formed therein, the pressure inlet providing fluid communication between a first end of the first piston and a source of pressurized fluid.

16. The suction throttle valve of claim 15, wherein the source of pressurized fluid is the crankcase chamber.

17. The suction throttle valve of claim 12, wherein a first spring urges the first piston in a direction away from the partition.

18. The suction throttle valve of claim 12, further including a second piston reciprocatingly disposed in the second chamber of the cavity, wherein the second piston is configured to cause a variable restriction of an outlet formed in the valve housing, the outlet providing fluid communication between the second chamber of the cavity and the suction chamber.

19. A suction throttle valve for a variable displacement compressor having a compressor housing including a crankcase chamber and a suction chamber formed therein, the suction throttle valve comprising:

a valve housing including a cavity formed therein, the valve housing further including a suction inlet formed therein;

a suction port extending laterally from the valve housing, the suction inlet providing fluid communication between the suction port and the cavity;

a first piston reciprocatingly disposed in the cavity, the first piston having a first end and a second end, the first end in fluid communication with the crankcase chamber and the second end in fluid communication with the suction port;

a first spring urging the first piston in a direction away from the suction inlet formed in the valve housing; and a partition dividing the cavity into a first chamber and a second chamber and dividing the suction inlet into a first suction inlet and a second suction inlet, wherein the first piston moves toward the suction inlet to cause a variable restriction of the suction inlet when a force applied to the first end of the first piston caused by a pressure of a first fluid originating from the crankcase chamber exceeds a force applied to the second end of the first piston caused by a pressure of a second fluid flowing through the suction port and the urging of the first spring; wherein the suction port is not arranged in parallel to a direction the first piston reciprocates in the cavity.

* * * * *